(12) United States Patent
Alcock et al.

(10) Patent No.: US 6,280,098 B1
(45) Date of Patent: Aug. 28, 2001

(54) OPTICAL FIBRE CONNECTOR

(75) Inventors: Ian Peter Alcock, Hemel Hempstead; David James Pointer, Chandlers Ford, both of (GB)

(73) Assignee: Point Source Limited (GB)

( * ) Notice: Subject to any disclaimer, the term of this patent is extended or adjusted under 35 U.S.C. 154(b) by 0 days.

(21) Appl. No.: 09/073,961

(22) Filed: May 7, 1998

(30) Foreign Application Priority Data

May 9, 1997 (GB) .................................................. 9709479
Dec. 31, 1997 (GB) .................................................. 9727519

(51) Int. Cl.$^7$ .................................................. G02B 6/38
(52) U.S. Cl. .............................................. 385/64; 385/82
(58) Field of Search ............................... 385/64, 82, 60, 385/78

(56) References Cited

U.S. PATENT DOCUMENTS

| | | |
|---|---|---|
| 3,655,275 | 4/1972 | Seagreaves . |
| 3,922,064 | 11/1975 | Clark et al. . |
| 4,009,931 | 3/1977 | Malsby et al. . |
| 4,146,300 | 3/1979 | Kaiser . |
| 4,193,664 | 3/1980 | Ellwood . |
| 4,215,913 | 8/1980 | Robinson et al. . |
| 4,217,031 * | 8/1980 | Mignien et al. ..................... 385/64 |
| 4,296,999 | 10/1981 | Mead . |
| 4,429,949 * | 2/1984 | Cartier ............................... 385/64 |
| 4,456,334 | 6/1984 | Henry et al. . |
| 4,478,485 * | 10/1984 | Khoe et al. ......................... 385/53 |
| 4,649,616 | 3/1987 | Bricker . |
| 4,696,538 | 9/1987 | Despouys . |

(List continued on next page.)

FOREIGN PATENT DOCUMENTS

| | | |
|---|---|---|
| 26 02 662 | 1/1977 | (DE) . |
| 26 02 662 | 7/1977 | (DE) . |
| 0 128 768 | 12/1984 | (EP) . |
| 0 185 413 A1 | 6/1986 | (EP) .............................. G02B/6/38 |
| 0 293 044 A2 | 11/1988 | (EP) .............................. G02B/6/38 |
| 0 293 044 A3 | 11/1988 | (EP) .............................. G02B/6/38 |
| 0 306 220 | 3/1989 | (EP) . |
| 0 457 284 A2 | 11/1991 | (EP) .............................. G02B/6/38 |
| 0 457 284 A3 | 11/1991 | (EP) .............................. G02B/6/38 |
| 1 535 499 | 12/1978 | (GB) . |
| 2 311 621 | 10/1997 | (GB) .............................. G02B/6/36 |
| WO 90/15350 | 12/1990 | (WO) ............................. G02B/6/38 |

*Primary Examiner*—Rodney Bovernick
*Assistant Examiner*—Michael J. Stahl
(74) *Attorney, Agent, or Firm*—Liniak, Berenato, Longacre & White

(57) ABSTRACT

An optical fibre connector comprising a hollow cylindrical body 2 having a throughbore 3 with an inner surface 4. A hollow sleeve or carrier 6 in the form of a cylindrical tube having a throughbore 8 fits snugly within the hollow body throughbore 3. The sleeve 6 can receive and releasably retain a pair of optical fibre assemblies 11 which are to be optically coupled to one another by means of the connector. The sleeve 6 accommodates a plurality of discrete individual engagement means in the form of balls 10 in holes around it circumference. The balls 10 protrude through the holes in the sleeve into the throughbore 3, and are free to rotate as an optical fibre assembly moves past them. The optical fibre assemblies 11 are biassed against the balls 10 and thereby against the inner surface of the connector body by resilient biassing means in the form of spring arrangements 14. Each spring arrangement 14 comprises an elongate resilient strip 15 pivoted about its midpoint on a pivot 20.In this arrangement, as an optical fibre assembly 10 is inserted into the carrier 6, the pivoting action of the spring prevents the biassing force being applied by the spring on the assembly until a first 21 and second 22 end of the assembly are in contact with a distal 23 and proximal 24 end respectively of the spring arrangement.

17 Claims, 4 Drawing Sheets

U.S. PATENT DOCUMENTS

| | | |
|---|---|---|
| 4,753,510 | 6/1988 | Sezerman . |
| 4,824,202 * | 4/1989 | Auras ...................................... 385/93 |
| 4,884,861 | 12/1989 | Nodfelt . |
| 4,889,406 | 12/1989 | Sezerman . |
| 5,181,272 | 1/1993 | Hopper ................................ 385/139 |
| 5,208,888 | 5/1993 | Steinblatt et al. . |
| 5,212,753 * | 5/1993 | Maranto ................................ 385/80 |
| 5,247,595 | 9/1993 | Földi ..................................... 385/78 |
| 5,400,674 | 3/1995 | Arnone et al. . |
| 5,638,472 | 6/1997 | Van Delden ......................... 385/33 |

* cited by examiner

OPTICAL FIBRE CONNECTOR

The present invention relates to connectors for holding optical fibres, and in particular to a connector which allows two optical fibres to be repeatably optically coupled, decoupled and recoupled without any substantial change in optical performance.

In many optical applications, electromagnetic (e.g. laser) radiation is transmitted along optical fibres and thus must be coupled into the optical fibre at one end thereof.

One problem with coupling radiation into an optical fibre is that it is necessary to align the end of the optical fibre with a high degree of accuracy if transmission losses are to minimised. This is because of the small size of optical fibres which means that even small errors in the positioning of the end of an optical fibre can result in large energy losses when the radiation is coupled into the optical fibre end.

This problem is exacerbated if the fibre end is comtaminated with dust or dirt, as might be the case when the fibre is used in a non-clean environment. Such comtamination causes large energy losses and may result in an inoperable coupling to the fibre.

To help reduce the above problem a lens is often used to focus the incicent radiation beam onto the end of the optical fibre. The lens, in effect, magnifies the end of the optical fibre, thereby increasing its effective size. This reduces the sensitivity of the coupling to linear displacement between the fibre end and the incident beam and to contamination of the fibre end. Such an arrangement where a lens is used to magnify an optical fibre end is often referred to as an 'expanded beam' arrangement.

Typically the end of the optical fibre and the lens are mounted in an elongate cylindrical tube that holds the lens and fibre in a fixed, particular positional relationship to each other. This helps to avoid losses due to misalignment between the lens and fibre in use. This assembly is usually known as a lens barrel or lens tube. The lens tube is often arranged so that an emerging beam has a particular alignment (e.g. is centred) with respect to a datum surface, such as the longitudinal outside surface, of the lens tube.

However, such an expanded beam arrangement has increased sensitivity to angular misalignment (i.e. relative tilt) between the optical axis of the fibre and the optical axis of the incident beam which is being coupled into the fibre, because any such misalighment results in the lens no longer focussing the incident beam exactyly on the optical axis of the fibre. Rather, the focussed beam is displaced across the fibre end face, thereby leading to transmission losses. In an expanded beam arrangement such losses due to relative tilt between the optical axis of the fibre and the incident radiation beam are more significant than any losses due to lateral displacement between the optical axis of the fibre and the incident radiation beam. Therefore, even when using a lens tube, any coupling connector must ensure good angular alignment between the lens tube and incident light beam.

One way to achieve this is to have a connector having a throughbore which is sized to fit very snugly around the lens tube, such that the lens tube when inserted in the throughbore cannot tilt relative to the throughbore. By ensuring correct alignment of the connector throughbore with the incident radiation beam, tilt misalighment can be avoided. However, this arrangement requires precise and accurate construction of the connector, which can be difficult and expensive to achieve. Also, it can be difficult to insert the lens tube in the throughbore, because the necessarily tight fit means that any slight misalignment as the tube is inserted can result in the tube getting stuck in the bore. Also, any dirt or grit within the connector throughbore or on the lens tube will interfere with the fit and operation of the connector. This arrangement is not therefore really suitable for use in non-clean or more rugged environments.

Alternative methods of achieveing good alignment rely on adjusting or manipulating the relative position of the fibre within the connector once it is inserted therein. However, such adjustment can in practice be difficult and require more complex connector constructions. In many situations one would like to be able to couple radiation into an optical fibre without the need to carry out any adjustments. For example, it is often necessary to repeatedly couple and decouple an optical fibre, such as when adjusting components or moving equipment. It is not desirable to have to adjust the position of the fibre within a connector each time it is to be used.

According to a first aspect of the present invention, there is provided a connector for holding an optical fibre assembly, comprising:

a hollow body having a throughbore adapted to receive loosely the optical fibre assembly in use;

at least two discrete engagement means located at circumferentially spaced apart positions within the hollow body throughbore; and biassing means engageable against an inserted optical fibre assembly in use to bias the assembly against the engagement means and thereby against the hollow body;

wherein the biassing means and engagement means are arranged such that the biassing means can be engaged against an inserted optical fibre assembly in use in such a manner that the optical fibre assembly engages only the biassing means and the engagement means and in such an arrangement is spaced apart from the inner surface of the hollow body throughbore.

The connector of the present invention has a throughbore having discrete having engagement elements or means against which an inserted optical fibre assembly can be biassed in such a manner that the assembly only engages the body of the connector via the engagement means (and the biassing means). This means that an optical fibre assembly can always be arranged to engage the same parts of the connector (i.e. the engagement means) and thereby have its longitudinal axis in the same orientation within the throughbore, whenever it is inserted in the connector. An optical fibre assembly can thus be repeatedly relocated in the connector with its longitudinal axis in the same orientation, without the need for alignment adjustment after the assembly has been inserted in the connector. As noted above, this is important because tilt of an assembly within a connector can lead to transmission losses. There is also no need for the connector to receive the assembly tightly to ensure reliably repeatable orientation.

The connector of the present invention can further ensure that an inserted optical fibre assembly only engages the discrete engagement means and the biassing means and is held spaced from the main inner surface of the connector throughbore in use. This makes the connector less susceptible to degradation caused by dirt or contamination within the connector body or on the optical fibre assembly, and thus particularly suited for use in more rugged, non-clean environments.

For example, in this aspect of the present invention contamination could only be a problem if it occurred on the relatively small contact surfaces of the engagement means, biassing means and corresponding regions on the assembly (as compared to arrangements in which the assembly contacts a connector over substantially all of its outer surface, where any contamination will almost invariably be a problem). Also, any sliding between surfaces as an assembly is inserted will tend to clean the surfaces and push the dirt into the gap between the engagement means and throughbore inner surface. Furthermore, the relatively small contact areas between the assembly and connector in use means that thee is a relatively high load at the contact points, which will tend to squeeze dust and dirt out from between the surfaces. Because the assembly is spaced from the throughbore surface, ther is space for this dirt to move to where it will not interfere with the holding of the assembly, unlike in more tight fitting systems where any moved dirt will tend to cause a problem elsewhere.

The connector of the present invention is suitable for any sort of optical fibre assembly, such as the lens tubes or barrels discussed above, a tube or barrel mounting an optical fibre and another optical component or element (such as a lens) (preferably in a fixed relationship), or even an optical fibre on its own.

The connector can be adapted to receive a single optical fibre assembly in one end thereof in order to connect the assembly to another optical component, such as a laser source, lens array, etc, or simply to hold the assembly (e.g. where it is desired to transmit light from a fibre into free space). In such arrangements the end of the connector not receiving the optical fibre assembly would be adapted to be engageable with the optical component, etc., and in a particular orientation, if appropriate. It could for example be adapted to be fixed on a laser source.

In a particularly preferred embodiment, the connector is adapted to receive an optical fibre assembly at each end, such that the connector can couple two optical fibre assemblies. In this embodiment the connector would include biassing means and engagement means, as in the first aspect of the present invention, arranged to engage each assembly appropriately. Preferably there are two separate sets of biassing means and engagement means, one set for each optical fibre assembly, although this is not essential and the two assemblies can engage the same biassing means and engagement means, if desired.

The present invention is particularly suited as a connector for coupling two optical fibre assemblies which are pre-aligned so that the axis of their emerging light beam is parallel, e.g. centred, with respect to the outside londgitudinal surface of the assembly, since by using identically arranged engagement and biassing means, parallel orientation of the optical axes of the assemblies can be ensured, without the need for careful adjustment of the positions of the assemblies in the connector.

This arrangement of the present invention is particularly advantageous because tilt between two optical fibre assemblies in the connector can be significantly reduced or even eliminated, simply by using uniform diameter engagement means and a uniform bore hollow body. The actual diameter of the engagement means or hollow body throughbore is not as critical, since relative linear displacement between the two optical fibre assemblies does not cause as significant losses as tilt misalignment. Uniformity is more easily achieved than absolute accuracy.

The engagement means can be any suitable means that can provide discrete engagement surfaces for an optical fibre assembly with the connector throughbore and space the assembly fromn the throughbore inner surface. For example, they could comprise redges or discrete studs extending radially from the throughbore inner surface towards the longitudinal axis of throughbore. They could be integral with or permanently fixed to the throughbore inner surface, or separate, discrete components. In the latter case the arrangement should be such that in use when an assembly is biassed against the engagement means, they themselves are then biassed against the hollow body appropriately. The engagement means preferably substantially do not deform when an optical fibre assembly is biassed against them.

The engagement means are preferably adapted and arranged such that they engage an inserted optical fibre assembly and/or the throughbore (if appropriate) at discrete points, rather than over an extended region. This helps to ensure a reliably repeatable engagement. The engagement means could, for example, have spherical or hemispherical contact surfaces.

The engagement means preferbly are arranged such that they will in use space an inserted optical fibre assembly substantially uniformly from the throughbore inner surface along the entire length of the assembly. Thus, all the engagement means are preferably arranged such that they extend substantially the same distance radially towards the throughbore axis from the throughbore inner surface when an inserted assembly is biassed against them. They could for example all be of substantially equal diameter. This can help to ensure that the longitudinal axes of the throughbore and optical fibre assembly or assemblies are parallel.

Engagement means are preferably located at spaced intervals along the length of the throughbore as well as at spaced intervals around the circumference of the throughbore, such that a properly inserted optical fibre assembly engages in use longitudinally and circumferentially spaced engagement means. This helps further to fix an inserted optical fibre assembly against tilt and movement in all directions and thus ensure consistency and repeatability of its orientation within the connector. Preferably the arrangement of engagement means is symmetrical about a plane containing the longitudinal axis of the hollow body, or symmetrical about a plane perpendicular to the longitudinal axis of the hollow body, or most preferably both. The engagement means should preferably generally be arranged towards one side of the throughbore, and generally opposed to the biassing means.

In a preferred embodiment, there are four engagement means arranged in two pairs spaced along the longitudinal axis of the throughbore, with the individual engagement means of each pair being located at the same longitudinal position in the throughbore but spaced from each other around the bore's circumference. The spacing of the engagement means should preferably be such that a single optical fibre assembly can be arranged to lie beneath two longitudinally spaced pairs of engagement means simultaneously. Additional longitudinally spaced pairs can be provided, if desired. For example, where it is desired to couple two optical fibre assemblies, there are preferably eight engagement means, arranged in circumferentially spaced pairs at four spaced apart locations along the longitudinal axis of the throughbore, i.e. two pairs for each assembly.

The engagement means should be resistant to and preferably secured against longitudinal movement as an optical fibre assembly is inserted or removed. However, they are preferably free to rotate as an assembly is moved past them. Such rotation can make it easier to insert or remove an assembly. Furthermore, it allows different parts of the engagement means surface to engage an optical fibre assembly for any given insertion. Such rotation provides, in effect, a replenishable surface for engaging an assembly, and will tend to even out any wear of the engagement means surfaces since rotation of the engagement means will bring a new part of their surface into contactl with the assembly. The rotation also means that insertion and removal of an assembly will tend to be self-cleaning as the surfaces slide against each other, thereby making the connector even more suited to use in rugged, non-clean environments.

The engagement means thus preferably comprise rotatable members, such as suitably mounted balls or rotatable rollers or cylinders.

It is believed that the use of rotatable members to engage an optical fibre assembly in a connector for holding an optical fibre assembly is advantageous in its own right, for the reasons given above. Thus according to a second aspect of the present invention, there is provided an optical fibre assembly connector for removably retaining an optical fibre assembly comprising a hollow body having a through bore for receiving the optical fibre assembly and a plurality of engagement means located within the throughbore and arranged to engage the outer surface of an inserted optical fibre assembly in use: wherein the engagement means comprise rotatable members arranged such that they are free to rotate with the throughbore whereby different parts of the engagement means surfaces may be brought into contact with an optical fibre assembly in use.

In this aspect of the invention, the connector again preferably comprises biassing means for biassing an inserted optical fibre assembly against the engagement means in use.

The engagement means could be rotatably mounted or carried by the connector hollow body directly. However, in a particularly preferred embodiment the connector includes a hollow sleeve mounted coaxially within the connector body throughbore and adapted to receive the optical fibre assembly, which carries the engagement means in such a manner that they are free to rotate. The sleeve could, for example, include a plurality of holes located appropriately in its longitudinal surface, with an engagement means being located in each hole in such a manner that it is free to rotate. This is a particularly convenient way of making the engagement means rotatable. For example, where the engagement means are balls, they could be simply placed in the holes. Alternatively, the holes could be configured to support axles of, for example, rotatable rollers. The engagement means preferably should be sized and arranged such that they can protrude beyond each longitudinal surface of the sleeve simultaneously, as this enables them to engage the throughbore inner surface and the optical fibre assembly simultaneously, such that the assembly does not have to engage the connector body via contact with the sleeve. They are preferably free to float radially of the sleeve, at least a small distance.

The engagement means should preferably be arranged such that they are retained in the throughbore even when an optical fibre assembly is not inserted. This prevents the engagement means falling out of the connector when an assembly is not inserted. Thus, where a sleeve is used, the holes in the sleeve are preferably sized such that the engagement means can protrude into the sleeve bore through the holes, but cannot pass completely through the holes.

The biassing device or means can be any suitable means which can bias an inserted optical fibre assembly against the engagement means and therby against the inner surface of the connector body throughbore. it could for example comprise a screw mounted in the hollow body which can be screwed into the throughbore to engage the optical fibre assembly. The biassing means could be arranged to apply its biassing force automatically whenever an optical fibre assembly is inserted, or such that the biassing force is selectively applicable by a user.

The force applied by the biassing means onto each engagement means in use is preferably substantially equal.

The biassing means are preferably therefore arranged in generally opposed locations around the circumference of the throughbore to the engagement means. The arrangement of biassing means and engagement means is preferably symmetrical about a plane containing the longitudinal axis of the throughbore.

The biassing means does not have to act at substantially the same longitudinal position along the throughbore as each engagement means, but preferably does so, as this can help to avoid bending of the optical fibre assembly in use. There could, for example, be separate biassing means at each longitudinal position of an engagement means. However, preferably there is a single biassing means (or at least a single biassing means for each optical fibre assembly, where the connector can receive two assemblies), but arranged such that it applies its biassing force at each longitudinal position of an engagement means that engages the assembly against which the biassing means acts in use. This helps to ensure that each engagement means engages an optical fibre assembly with the same force in use.

The biassing means could, for example, comprise an elongate plate or strip extending along the throughbore and movable towards and away from the longitudinal axis of the throughbore which has contact means mounted thereon for contacting the optical fibre assembly in use at the same longitudinal possitions as the engagement means. Where two spaced-apart pairs of engagement means are used, there are preferably therefore two contact means spaced longitudinally along the plate at the same longitudinal spacing as the engagement means. Where a biassing force is applied to the plate, it is preferably done so equidistant from the contact means, again so as to help ensure equal contact forces in use.

The biassing means preferably engage an inserted optical fibre assembly at discrete points, rather than over an extended region, for the same reasons that the engagement means preferably do so. Thus it or they preferably include contact means adapted so as to engage an optical fibre assembly in point contact in use. The contact means could, for example, have spherical or hemispherical contact surfaces. The contact means could also be in the form of rotatable members, if desired.

In a particularly preferred embodiment, the biassing means are resilient biassing devices or means that can resiliently bias an optical fibre assembly against the engagement means in use. The use of resilient biassing means allows the assembly to be inserted and removed without the need to positively adjust the position of the biassing means (since they can move resiliently to allow the assembly to be inserted or removed). The resilient biassing means could, for example, comprise a spring or springs or magnets arranged to act appropriately on an inserted optical fibre assembly.

A further advantage of resilient biassing means is that the biassing force applied to the optical fibre assembly can more reliably and consistently applied, as compared to, for example, using a screw acting directly on the assembly to bias it against the engagement means. It is more difficult to reliably repeat the biassing force with a non-resilient biasing means. This can make it more difficult to repeat exactly the position of the assembly in the connector. Using non-resilient force also increases the risk of the applied force being too great, which could damage the assembly or connector and also reduce the repeatability of the connection.

Where a sleeve is mounted in the connector throughbore, it should of course, be appropriately arranged to accomodate the biassing means. It could, for example, have holes located in its circumference to allow the biassing means to enter the bore and engage an inserted optical fibre assembly.

The engagement means and biassing means contact surfaces are preferably made of hard materials so as to reduce wear in use.

It will be appreciated that repeated use of the connector of the present invention with a given optical fibre assembly, i.e. repeated removal and reinsertion of the assembly, (for which it is particularly suited) could mean that wear will tend to take place, and in the case where there are longitudinally spaced apart engagement means, wear will tend to be greater at the end of the optical fibre assembly which has to be pushed past both sets of engagement means in use as compared to the opposite end which only passes one set of engagement means as the assembly is inserted or removed. Such uneven wear could include tilt, which, as noted above, is particularly undesirable in an expanded beam arrangement.

To avoid this problem of uneven wear, the biassing means are preferably arranged such that the biassing force is not applied except when the optical fibre assembly is adjacent all the engagement means which it is to engage in use; for example, where it is to engage only two longitudinally spaced sets of engagement means in use, when it is level with or adjacent the inner, second set of engagement means.

The biassing means could, for example, be arranged such that the biassing force is not applied until the optical fibre assembly is substantially fully inserted in the connector, or is inserted in the connector a predetermined distance, or such that the biassing force can be selectively applied by a user. With a resilient biassing means this latter arrangement could be achieved by, for example, providing actuating means which in its actuated state causes the resilient biassing means to engage an inserted optical fibre assembly, but whiclh can be returned in an unactuated state to remove or not apply the resilient biassing force. For example, a manually actuable releasable pin could be provided which when pressed forces a resilient biassing means (e.g. spring) into a position in which it would engage an inserted optical fibre assembly. In this arrangement the connectpr is preferably provided with a locking means to maintain the biassing means in its actuated state, preferably in the form of a locking collar.

However, such a system requires extra action by a user to actuate the biassing means, and also requires access (whether directly or indirectly) by a user to the biassing means, which could make the connector construction more complicated and also more difficult to seal against the environment in which it is used (such that it may, for example, be more susceptible to dirt or water ingress).

Thus in a particularly preferred embodiment, the biassing means is arranged such that it does not apply a biassing force to an inserted optical fibre assembly until an inserted assembly overlaps all the pairs of engagement means that it is to engage in use, or is fully inserted, and then automatically applies the biassing force whenever the assembly overlaps all those engagement means. For example, where there are two longitudinally spaced pairs of engagement means for each optical fibre assembly, the biassing means is preferably arranged to apply its biassing force automatically once an inserted assembly overlaps both longitudinally spaced pairs of engagement means but not before. This arrangement is particularly suited for use with resilient biassing means, since it means that the biassing force is only applied once the optical fibre assembly has reached the last (e.g. second) pair of engagement means that it is to engage in use, such that ends of the optical fibre assembly experience equal load (and thus wear) as the assembly is moved past the engagement means as it is inserted or withdrawn. Thus any wear due to the insertion or removal of the assembly is now similar along the length of the assembly, and so the assembly is merely displaced, rather than tilted, by any such wear that does occur. As noted above, a linear displacemnet causes less losses than a tilt.

In this embodiment, the biassing means could, for example, extend longitudinally within the throughbore and be arranged within the throughbore such that it can pivot lengthwise (like a see-saw). This arrangement means that as an optical fibre assembly is inserted and engages the proximal end of the biassing means, the biassing means can pivot away such that no force is applied substantially until such time as the assembly engages the distal end of the biassing means, at which point the biassing means is puched to pivot in the opposite direction thereby applying force to both ends of the assembly simultaneously.

The biassing means should preferably be of a configuration so as to help the pivoting action. It could, for example, comprise a substantially planar elongate strip supported on an appropriate pivot, preferably at the mid-point along its length. This arrangement of the biassing means is particularly suited to resilient biassing means which could, for example, comprise a longitudinally extending spring plate pivoted about its mid-point. Contact means to engage the optical fibre assembly can be provided at each longitudinal end of the biassing means, if desired, and be shaped and arranged so as to help the pivoting action. They could, for example, comprise hemispheres mounted on the surface of the biassing means.

It is believed that the use of a pivotable biassing means is particularly advantageous in its own right. Thus, according to a third aspect of the present invention, there is provided a connector for holding an optical fibre assembly, comprising a hollow body having a throughbore for receiving the optical fibre assembly in use; and biassing means within the throughbore for biassing an inserted optical fibre assembly against the connector body; wherein the biassing means is arranged such that it will pivot as an optical fibre assembly is pushed past it in the throughbore.

The connector can include a locking means, such as locking collar, to retain an inserted optical fibre assembly in the connector. This locking means could also be used to lock the biassing means in its actuated position, if appropriate and desire. Stops can also be provided in the hollow body throughbore to prevent an optical fibre assembly being inserted past a particular point.

In a preferred embodiment of the present invention, The connector is arrangeable such that an optical fibre assembly can onlly be inserted in the connector in a particular orientation with respect to rotation about the longitudinal axis of the connector body throughbore. Such a fixed rotational alignment can be necessary and desired in some optical systems. An example of this would be where it is important to maintain polarisation of laser radiation, and polarisation maintaining optical fibres are being used. Another example is where plural fibres running side-by-side in an optical fibre assembly are to be aligned. Often there will only be one rotational orientation when all the fibres are correctly aligned with the optical component (s) to which they are to be coupled. By appropriate rotational fixing of the optical fibre assembly relative to the connector, the correct rotational alignment can be achieved and ensured.

One way to achieve this would, for example, be to indicate the rotational directions to be aligned on the optical fibre assembly and the connector such that they can be appropriately aligned in use. However, this arrangement is not necessarily desirable, since each time the optical fibre assembly was removed from the connector, it would be necessary to realign it upon reinsertion.

In a particularly preferred embodiment therefore, the connector further comprises a separable collar which mates in a fixed orientation with respect to rotation about the longitudinal axis of the connector throughbore with the connector body, which collar is securable to an optical fibre assembly in use.

In this arrangement the optical fibre assembly can be inserted in the connector and can then be rotationally aligned as desired, and then, while maintaining the rotational alignment between the collar and optical fibre assembly, the collar can be secured to the optical fibre assembly. The optical fibre assembly and the collar secured to it can then be subsequently removed and resinserted into the connector, with the assurance that the optical fibre assembly will be in the correct rotational orientation when the collar is correctly mated with the connector. This arrangememnt ensures that the optical fibre assembly can be removed and resinseeted in the connector without loss of rotational alignment. Thus the optical fibre assembly can be removed from the connector and reinserted therein without the loss of polarisation alignment or the need for subsequent rotational alignment.

The collar can be secured to the optical fibre assembly by any suitable means, such as grub screws. It can be arranged to mate with the connector body in a predetermined rotational alignment by any suitable means, such as the connector body or collar or connector body, respectively.

The collar can also be used to fix the position of the optical fibre assembly along the longitudinal axis of the connector throughbore, by securing it to the optical fibre assembly at an appropriate point along the length thereof.

A number of preferred embodiments of the present invention will now be described by way of example only and with reference to the accompanying drawings, in which.

Figure 1:
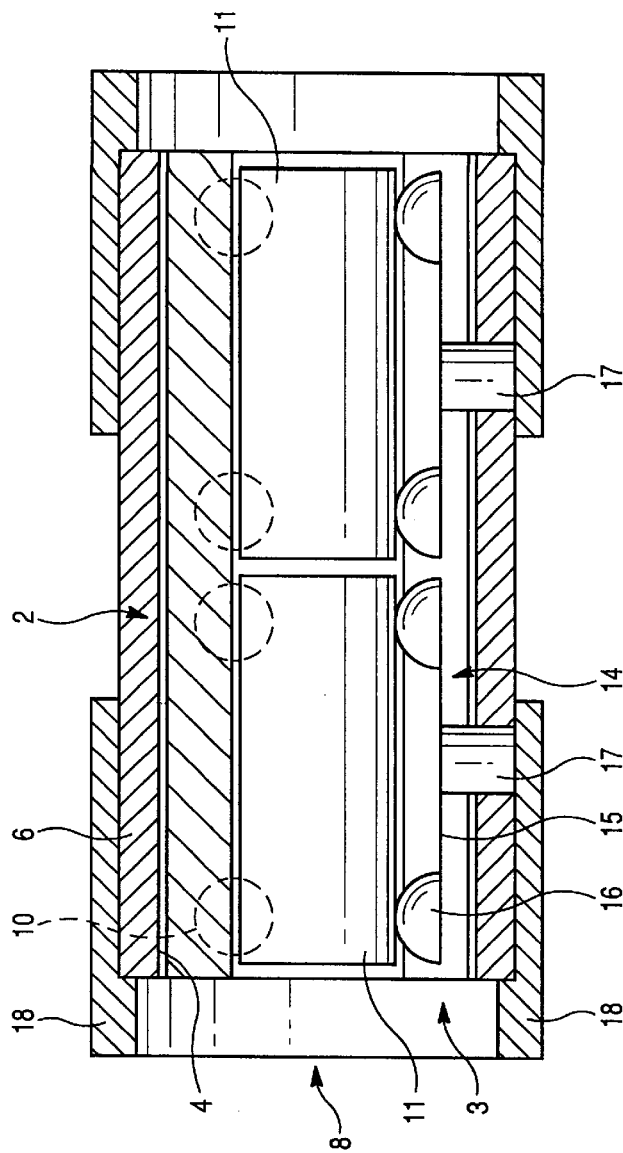
FIG. 1 shows a side cross-sectional view of an optical fibre connector in accordance with a first embodiment of the present invention.
Figure 2:
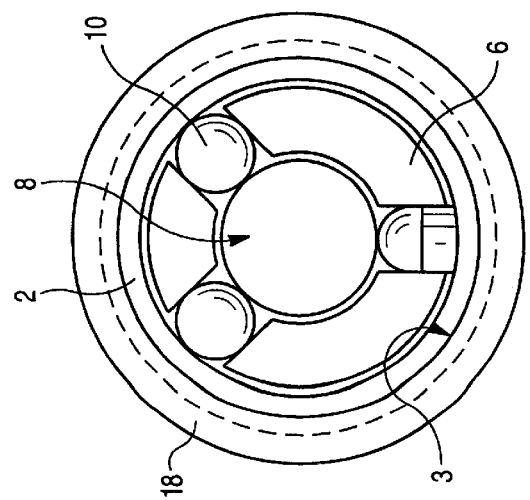
FIG. 2 is a schematic cross-sedtional view of the optical fibre connector of FIG. 1.

The optical fibre connector of a first embodiment of the present invention comprises a hollow cylindrical body 2 having a throughbore 3 with an inner surface 4. A hollow sleeve or carrier 6 in the form of a cylindrical tube having a throughbore 8 fits snugly within the hollow body throughbore 3. The sleeve 6 can receive and releasably retain a pair of optical fibre assemblies 11 (one in each end) which are to be optically coupled to one another by means of the connector.

While the outer body, sleeve and optical fibre assemblies are shown as being in the form of cylindrical tubes, it should be appreciated that they can have other geometries, if desired.

The optical fibre assemblies 11 are shown in this embodiment as being lens tubes which carry an optical fibre and a lens. However, the optical fibre assembly is not restricted to such arrangements. It could, for example, comprise a cylinder mounting a different optical element and an optical fibre, a cylinder mounting an optical fibre alone, or simply the optical fibre on its own.

The sleeve 6 accomodates a pluralitly of discrete individual engagement elements or means in the form or balls 10 in holes around its circumference. The arrangement is such that the balls 10 are positioned in circumferentially spaced pairs at spaced intervals along the longitudinal axis of the connector throughbore. Their longitudinal spacing is such that each optical fibre assembly engages two pairs of balls when properly inserted in the connector.

While the connector in this embodiment is shown as having a carrier accommodating eight balls, the connector is not restricted to accommodating this number of balls.

The balls 10 protrude through the holes in the sleeve into the throughbore 3. They are loosely held in place in the sleeve 6 such that they cannot move longitudinally along the sleeve, but are free to rotate as an optical fibre assembly moves past them and to float radially relative to the sleeve. The holes are sized such that the balls cannot fall out of the sleeve when the optical fibre assemblies are removed.

The diameters of all the balls 10 are substantially identical and the dimeter of the throughbore 3 is uniform along its length. This helps to prevent relative tilt between the two inserted optical fibre assemblies. The actual diameters of the balls and the throughbore are not as critical, since, as noted above, the energy losses caused by tilt misalignment are greater than the energy losses caused by a linear displacement between the ends of the optical fibre assemblies. Uniformity is more easily attained than absolute accuracy.

The optical fibre assemblies 11 are biassed against the balls 10 and thereby against the inner surface of the connector body by resilient biassing devices or means in the form of spring arrangements 14. Each spring arrangement 14 comprises an elongate resilient strip spring plate 15 having two contact means in the form of hemispheres 16 on the surface that faces the optical fibre assembly in use. The sleeve 6 has appropriate holes in its circumference to allow the hemispheres to protrude through the sleeve.

The spring arrangements 14 include manual actuating means in the form of a pin 17 connected to the midpoint of the spring plate and extending outwardly through the wall of the connector body in a direction perpendicular to the longitudinal axis of the connector body.

Prior to the insertion of an optical fibre assembly into the connector, the spring arrangement 14 is in an unactuated state with the pin 17 in its outermast position. Once the assembly 11 has been fully inserted to its in use position, the pin 17 can be pressed inwardly to cause the spring arrangement 14 to exert a force on the assembly. The assembly is then biassed against the balls 10 which are in turn biassed against the inner surface 4 of the connector body 2.

To maintain the spring 14 in its actuated state, the connector is provided with a locking means in the form of a slidable locking collars 18. The cross-sectional shape of the collars matches that of the connector body and each collar is slidable along the connector between a position in which it covers a pin 17 to maintain the spring arrangement 14 in an actuated state and a position in which the pin 17 is exposed (and can therefore be returned by the resilient force of the spring plate to its unactuated position).

This arrangement enables an optical fibre assembly to be inserted into and removed from the connector without the biassing force being applied. In this way, substantial wear on an assembly as it is inserted or removed can be avoided.

The connector can also include a separable collar (not shown) which mates with the main body of the connector in a single orientation with respect to rotation about the longitudinal axis of the connector throughbore. To achieve this the collar can have a pin which engages in a corresponding slot on the connector body. The collar can further include means, such as a number of grub screws, to enable it to be secured to an optical fibre assembly. The collar allows the rotational orientation of an inserted optical fibre assembly with respect of the connector to be fixed. For example, the optical fibre assembly can be rotated about its longitudinal axis within the connector until the desired rotational orientation, such as when the polarisation axes are aligned, is achieved. Once this orientation has been achieved the collar can be secured to the optical fibre assembly, therby ensuring correct roatational alignment of the optical fibre assembly relative to the connector when the collar is properly mated with the connector body thereafter.

In use, an optical fibre assembly would be inserted in each end of the connector, and once each assembly is properly inserted, the corresponding pin 17 depressed to bias the assembly against the balls 10 and thereby against the hollow body 2 of the connector. It should be noted that because of the spherical surfaces of the balls 10 and contact means 16, the engagement with the assembly is by point contacts, i.e. it is in accordance with the kinematic principle.

To remove the assemblies, the pins 17 are released to remove the biassing force, and the assemblies can then be readily removed.

During the insertion action, the outer surface of an optical fibre assembly will tend to slide against the surfaces of the balls and the biassing means contact surfaces. This sliding action will tend to clean the surfaces. The relatively high load at the point contact between the outer surface of the optical fibre assembly and the balls, and between the inner surface 4 of the outer tube 2 and the balls, will tend to squeeze any dust or dirt out from between the contacting surfaces, thereby again helping to prevent any detrimental effects due to contamination or dirt.

The balls accommodated in the carrier are also likely to rotate as an assembly is inserted or removed and therefore a new portion of each ball will be exposed to make contact with the optical fibre assembly. Thus the wear on each ball will tend to even out. This rotation also helps to ensure that clean surfaces are always in contact.

Figure 3:
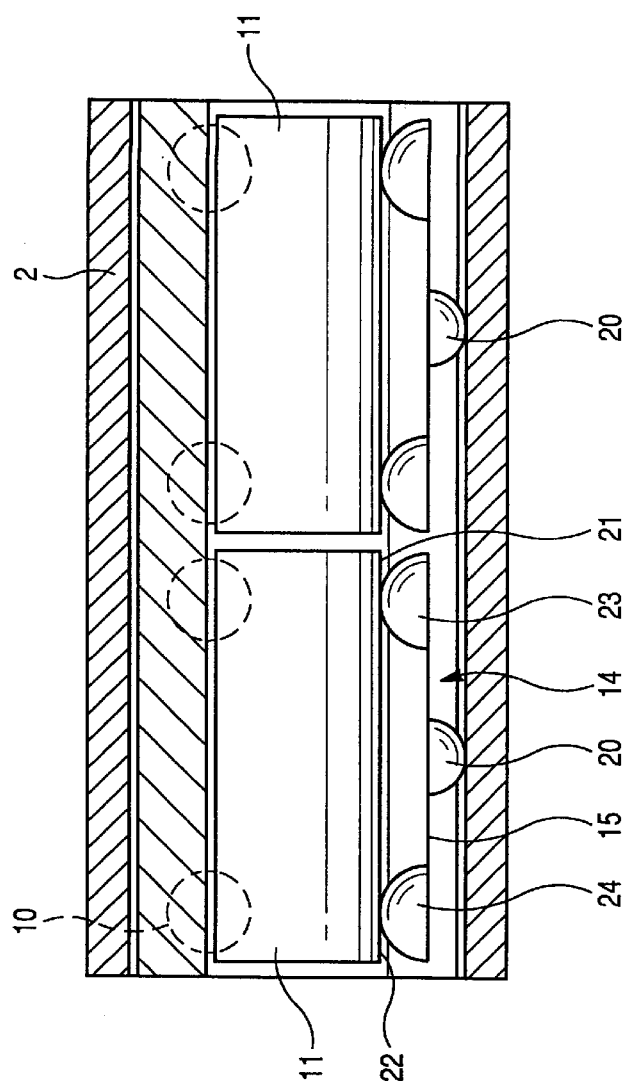
FIG. 3 shows a side cross-sectional view of an optical fibre connector in accordance with a second embodiment of the present invention.
Figure 4:
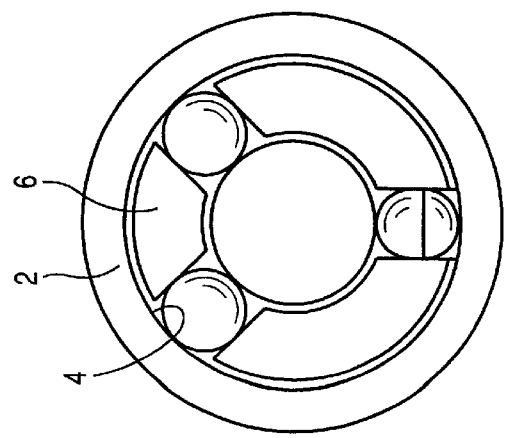
FIG. 4 is a schematic cross-sectional view of the optical fibre connector of FIG. 3.
Figure 5:
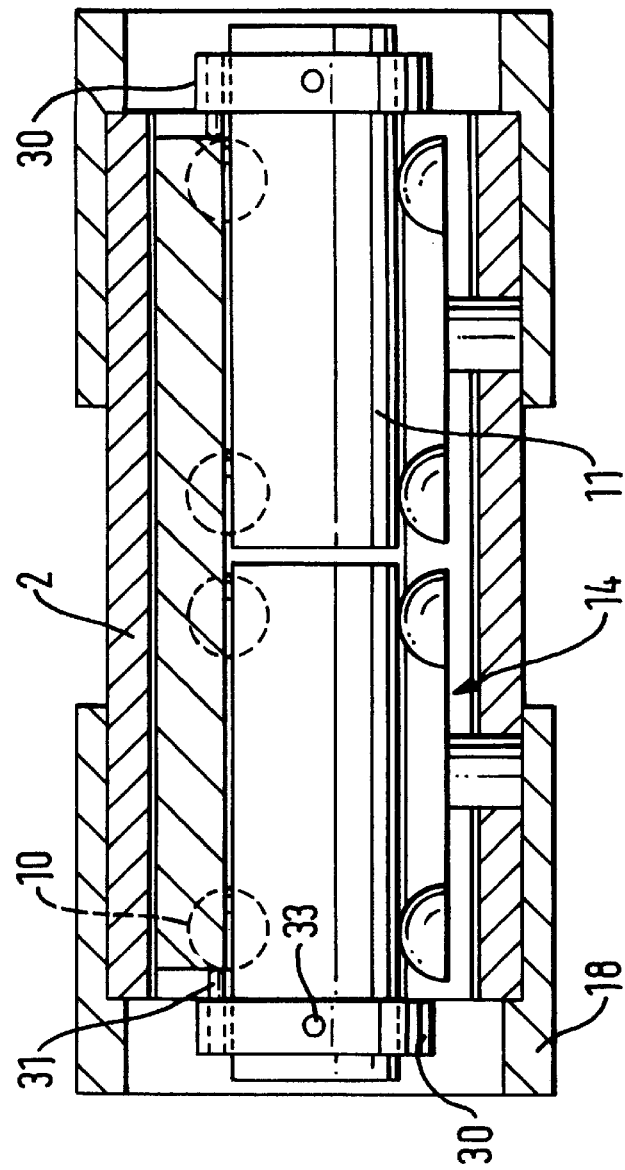
FIG. 5 is a side cross-sectional view of the optical fibre connector of FIG. 1 further comprising a collar for fixing the rotational orientation of the optical fibre assembly.
Figure 6:
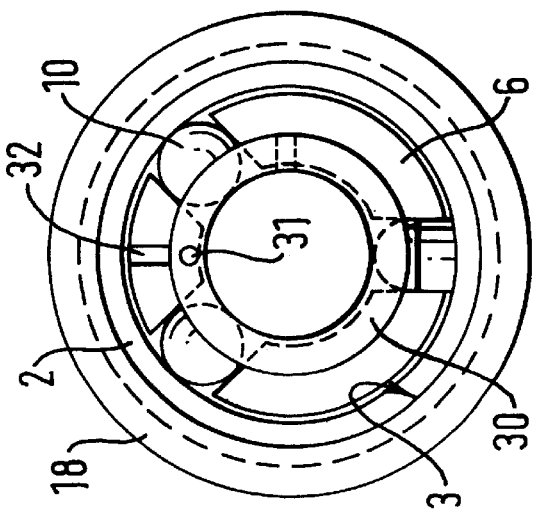
FIG. 6 is a schematic end cross-sectional view of the connector of FIG. 5.
Figure 7:
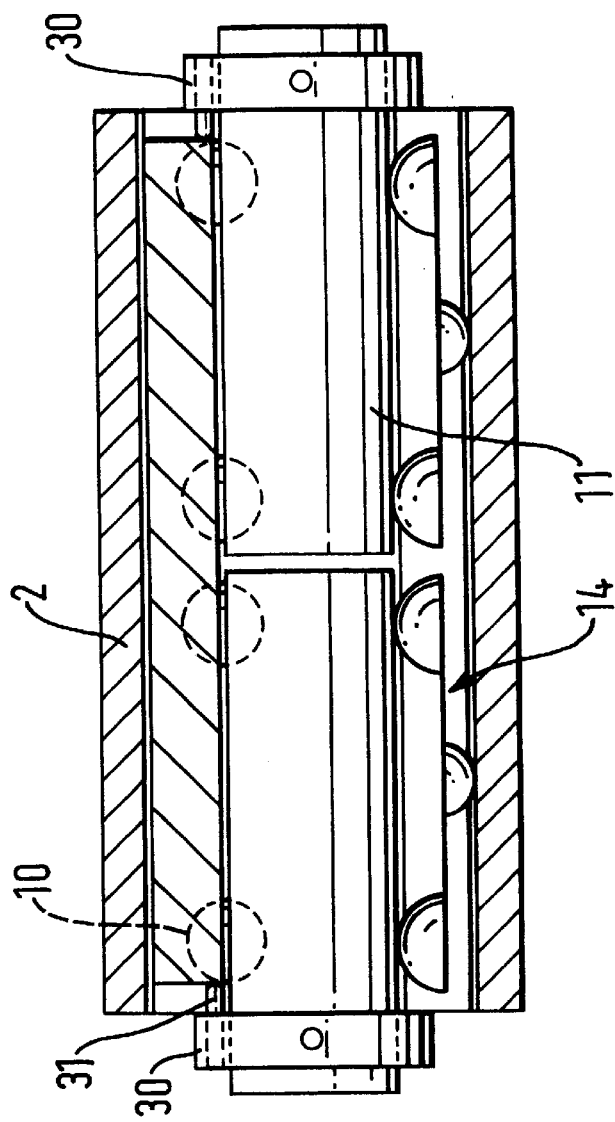
FIG. 7 is a side cross-sectional view of the optical fibre connector of FIG. 3 further comprising a collar for fixing the rotational orientation of the optical fibre assembly.
Figure 8:
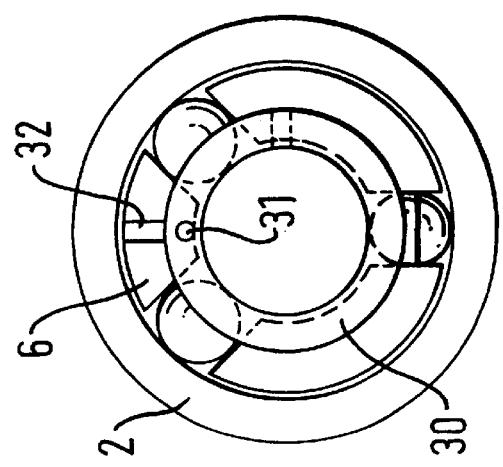
FIG. 8 is a schematic and cross-sectional view of the connector of FIG. 7.

FIGS. 3 and 4 show a a second embodiment of the present invention in which the biassing means is arranged in an alternative manner.

In this embodiment, instead of being actuated by pins pushed by a user, the spring arrangements 14 comprise elongate resilient strips 15 pivoted about midpoints by pivots 20 which engage the inner surface 4 of the throughbore 3. In this arrangement, as an optical fibre assembly 10 is inserted into the carrier 6, the pivoting action of the spring prevents any force being applied by the spring on the assembly until a first 21 and second 22 end of the assembly are in contact with a distal 23 and proximal 24 end respectively of the spring.

As an assembly is inserted, when the first end 21 of the optical fibre assembly reaches the proximal end 24 of the spring arrangement 14, the assembly pushes the end 24 of the spring down and the distal end 23 moves up correspondingly as the spring plate pivots about pivot 20. As the optical fibre assembly is inserted further and its first end 21 makes contact with the distal end 24 of the spring arrangement, the first end 21 of the assembly pushes the distal end 23 of the spring down and the proximal end 24 of the spring moves up as the spring arrangement again pivots about pivot 20 in the opposite direction. Both ends of the spring arrangement are then in contact with the optical fibre assembly, such that a load is applied to the assembly to bias it against the balld 10. The pivoting action ensures that the same load is applied to the first and second ends of the assembly.

Since in this arrangement no force is applied to the optical fibre assembly until the first and second ends of the assembly are in contact with the proximal and distal ends respectively of the spring, both ends of the assembly wear at the same rate. Without such an arrangement, repeated insertion of the assembly 11 past permanently resilient engaging biassing means would cause the first end 21 of the assembly to wear more rapidly than the second end 22 because the second end only passes one set of balls 10 with each insertion whereas the first end passes two sets (in the embodiment shown). Such even wear of the assembly will only cause a uniform linear displacement of the optical fibre assembly, whereas if the wear of the first and second ends of the assembly was uneven, this could cause a tilt of the longitudinal axis of the assembly with respect to the central axis of the connector. As noted above, tilt causes greater radiation energy loss than a linear displacement.

FIGS. 5 and 6, and 7 and 8, show modifications to the first and second embodiments, respectively, to enable rotational orientation of the inserted optical fibre assembly to be fixed. In these arrangements collars 30 each having a pin 31 which engages with a corresponding slot 32 in the sleeve 6 are provided. The collars can be secured by means of grub screws 33 to the optical fibre assembly 11. The pin slot 32 arrangement mean that the collars 30 and sleeves 6 will only mate in a single rotational orientation. Thus by fixing the collar to the assembly 11, its rotational orientation upon insertion can be fixed and reliably repeated.

The above embodiments have been described with reference to coupling two optical fibre assemblies. However, it would also be applicable to coupling a single optical fibre assembly to another optical component, or to other situations where accurate alignment of components (and not just optical ones) is necessary and where the accurate alignment of components could be affected by wear caused by their repeated connection.

What is claimed is:

1. A connector coupling two optical fibre assemblies, comprising:

a hollow body having a throughbore having an inner surface and adapted to removably receive an optical fibre assembly at each end in use;

a plurality of discrete engagement elements located at circumferentially spaced apart positions with the hollow body throughbore and located at least three spaced intervals along the length of the throughbore; and one or more resilient biassing devices engageable against the inserted optical fiber assemblies in use to bias resiliently the assemblies against the engagement elements and thereby against the hollow body;

wherein the engagement elements are such that they substantially do not deform when an optical fibre assembly is biassed against them; and wherein the engagement elements are arranged such that when two optical fibre assemblies are inserted in the connector, each inserted optical fibre assembly can be arranged to engage longitudinally and circumferentially spaced engagement elements; the biassing device and engagement elements are arranged such that a biassing device can be engaged against each inserted optical fibre assembly in use in such a manner that each optical fibre assenbky engages only a biassing device and engagement elements and in such an arrangement is spaced apart from the inner surface of the hollow body throughbore and is held by the biassing device and engagement elements such that its longitudinal axis is substantially parallel to the longitudinal axis of the hollow body throughbore.

2. The connector of claim 1, wherein the engagement elements are arranged to rotate as an optical fibre assembly is moved past them.

3. The connector of claim 2, wherein the connector includes a hollow sleeve mounted coaxially within the connector body throughbore and adapted to receive the optical fibre assemblies, which sleeve carries the engagement elements in such a manner that they are free to rotate.

4. The connector of claim 1, wherein the connector includes two separate sets of a biassing device and engagement elements, one set for eadh optical fibre assembly.

5. The connector of claim 1, further containing two optical fibre assemblies, each assembly comprising a cylindrical tube holding a lens and optical fibre in a fixed relationship.

6. The connector of claim 1, wherein there are eight discrete engagement elements arranged in four pairs spaced along the longitudinal axis of the throughbore, with the individual engagement elements of each pair being located at the same longitudinal position in throughbore but spaced from each other around the throughbore's circumference.

7. The connector of claim 1, wherein the engagement elements are arranged such that they will in use space an inserted optical fibre assembly substantially uniformly from the throughbore inner surface along the entire length of the assembly.

8. The connector of claim 1, wherein the biassing device is arranged such that the force applied by the biassing device onto each engagement element in use is substantially equal.

9. The connector of claim 1, wherein the biassing device can be selectively actuated to resiliently bias an optical fibre assembly against the engagement elements in use.

10. The connector of claim 1, wherein the biassing device is arranged such that it does not apply a biassing force to an inserted optical fibre assembly until the assembly has been inserted in a predetermined distance into the connector, and then automatically applies the biassing force.

11. The connector of claim 10, wherein there are two longitudinally spaced pairs of engagement elements for the optical fibre assembly to engage, and the biassing device is arranged to apply its biassing force automatically once an inserted assembly overlaps both longitudinally spaced pairs of engagement elements but not before.

12. The connector of claim 1, wherein the or each biassing device extends longitudinally within the connector body throughbore and is arranged within the throughbore such that it can pivot lengthwise as an optical fibre assembly is probed past it in the throughbore.

13. The connector of claim 1, wherein the connector is arrangeable such that an optical fibre assembly can only be inserted in the connector in a particular orientation with respect to rotation about the longitudinal axis of the connector body throughbore.

14. The connector of claim 13, wherein the connector further comprises a separable collar which mates in a fixed orientation with respect to rotation about the longitudinal axis of the connector throughbore with the connector body, which collar is securable to an optical fibre assembly in use.

15. A connector for holding an optical fibre assembly, comprising:

a hollow body having a throughbore having an inner surface and adapted to removably receive the optical assembly in use;

at least two discrete engagement elements located at circumferentially spaced apart positions within the hollow body throughbore; and a resilient biassing device engageable against an inserted optical fibre assembly in use to bias resiliently the assembly the engagement elements and thereby against the hollow body;

wherein the biassing device and engagement elements are arranged such that the biassing device can be engaged against an inserted optical fibre assembly in use in such a manner that the optical fibre assembly engages only the biassing device and the engagement elements and in such an arrangement is spaced apart from the inner surface of the hollow body throughbore; and wherein the biassing device comprises a substantially planar elongate strip supported on a pivot at the midpoint along its length and extends longitudinally within the connector body throughbore and is arranged within the throughbore such that it can pivot lengthwise.

16. The connector of claim 15, wherein the connector is adapted to receive an optical fibre assembly at each end, such that the connector can couple two optical fibre assemblies.

17. A connector for holding an optical fibre assembly, comprising a hollow body having a throughbore for receiving the optical fibre assembly in use; a plurality of discrete engagement elements located within the hollow body throughbore at spaced intervals within the hollow body throughbore at spaced intervals along the length of the throughbore and a biassing device within the throughbore for biassing an inserted optical fibre assembly against the engagement elements and thereby against the connector body, wherein the biassing device is arranged such that it will pivot as an optical fibre assembly is pushed past it in the throughbore such that it does not apply a biassing force to an inserted optical fibre assembly until the assembly has been inserted a predetermined distance into the connector past the biassing device in the throughbore, and then automatically applies the biassing force; and wherein the engagement elements are arranged such that an inserted optical fibre assembly can be arranged to engage longitudinally spaced engagement elements.

* * * * *

UNITED STATES PATENT AND TRADEMARK OFFICE
CERTIFICATE OF CORRECTION

PATENT NO. : 6,280,098 B1
DATED : August 28, 2001
INVENTOR(S) : Alcock et al.

It is certified that error appears in the above-identified patent and that said Letters Patent is hereby corrected as shown below:

Column 13,
Line 4, replace "assenbky" with -- assembly --;
Line 21, replace "eadh" with -- each --; and
Line 57, replace "probed" with -- pushed --.

Column 14,
Line 21, after "assembly" add -- against --.

Signed and Sealed this

Thirtieth Day of April, 2002

Attest:

JAMES E. ROGAN
Attesting Officer  Director of the United States Patent and Trademark Office